US009995934B2

United States Patent
Dobschal et al.

(10) Patent No.: US 9,995,934 B2
(45) Date of Patent: Jun. 12, 2018

(54) SPECTACLE LENS FOR A DISPLAY DEVICE THAT CAN BE FITTED ON THE HEAD OF A USER AND GENERATES AN IMAGE, AND DISPLAY DEVICE WITH SUCH A SPECTACLE LENS

(71) Applicant: Carl Zeiss Smart Optics GmbH, Aalen (DE)

(72) Inventors: Hans-Juergen Dobschal, Kleinromstedt (DE); Karsten Lindig, Erfurt (DE)

(73) Assignee: tooz technologies GmbH, Aalen (DE)

( * ) Notice: Subject to any disclaimer, the term of this patent is extended or adjusted under 35 U.S.C. 154(b) by 0 days. days.

(21) Appl. No.: 15/024,854

(22) PCT Filed: Sep. 25, 2014

(86) PCT No.: PCT/EP2014/070554
§ 371 (c)(1),
(2) Date: Mar. 25, 2016

(87) PCT Pub. No.: WO2015/044299
PCT Pub. Date: Apr. 2, 2015

(65) Prior Publication Data
US 2016/0246056 A1  Aug. 25, 2016

(30) Foreign Application Priority Data
Sep. 27, 2013 (DE) .................... 10 2013 219 623

(51) Int. Cl.
G02B 27/14 (2006.01)
G02B 27/01 (2006.01)
(Continued)

(52) U.S. Cl.
CPC ..... *G02B 27/0172* (2013.01); *G02B 27/0081* (2013.01); *G02C 11/10* (2013.01);
(Continued)

(58) Field of Classification Search
CPC .................................................. G02B 27/0172
(Continued)

(56) References Cited

U.S. PATENT DOCUMENTS 5,348,477 A  9/1994 Welch et al.
5,803,673 A  9/1998 Reinsch et al.
(Continued)

FOREIGN PATENT DOCUMENTS

DE  102011007812 A1  10/2012
WO  2006025317 A1  3/2006

OTHER PUBLICATIONS

International Preliminary Report on Patentability rendered by the International Bureau of WIPO for PCT/EP2014/070554, dated Mar. 29, 2016, 10 pages.

*Primary Examiner* — James Jones
(74) *Attorney, Agent, or Firm* — Skaar Ulbrich Macari, P.A.

(57) ABSTRACT

A spectacle lens for a display device that can be fitted on the head of a user and generate an image guides light bundles of pixels of the generated image, which are coupled into the spectacle lens via the coupling-in section of the spectacle lens, in the spectacle lens by reflections on the rear side and a reflecting surface lying opposite this to the coupling-out section and coupling them out of the spectacle lens via the coupling-out section. A splitter layer reflects a portion of light bundles reflected by the rear side towards the rear side and transmits a portion, wherein after reflection on the rear side the reflected portion strikes the splitter layer again and there, once again, is partially reflected towards the rear side and partially transmitted. The transmitted portions strike the facets are coupled out of the spectacle lens through the splitter layer and the rear side.

20 Claims, 5 Drawing Sheets

(51) Int. Cl.
*G02B 27/00* (2006.01)
*G02C 11/00* (2006.01)

(52) U.S. Cl.
CPC ............... *G02B 2027/013* (2013.01); *G02B 2027/0125* (2013.01); *G02B 2027/0178* (2013.01)

(58) Field of Classification Search
USPC .................................................. 359/630, 631
See application file for complete search history.

(56) References Cited

U.S. PATENT DOCUMENTS

| | | |
|---|---|---|
| 6,091,546 A | 7/2000 | Spitzer |
| 6,157,353 A | 12/2000 | Song et al. |
| 6,369,952 B1 * | 4/2002 | Rallison ............... G02B 27/017 359/630 |
| 6,825,987 B2 | 11/2004 | Repetto et al. |
| 7,719,769 B2 | 5/2010 | Sugihara et al. |
| 8,456,744 B2 | 6/2013 | Dobschal et al. |
| 8,970,961 B2 | 3/2015 | Dobschal et al. |
| 2006/0126181 A1 | 6/2006 | Levola |
| 2007/0008624 A1 | 1/2007 | Hirayama |
| 2008/0094586 A1 | 4/2008 | Hirayama |
| 2010/0220295 A1 | 9/2010 | Mukawa et al. |
| 2013/0250429 A1 | 9/2013 | Dobschal et al. |
| 2014/0192418 A1 | 7/2014 | Suzuki |

* cited by examiner

SPECTACLE LENS FOR A DISPLAY DEVICE THAT CAN BE FITTED ON THE HEAD OF A USER AND GENERATES AN IMAGE, AND DISPLAY DEVICE WITH SUCH A SPECTACLE LENS

PRIORITY

This application claims the benefit of German Patent Application No. 02013219623.7 filed on Sep. 27, 2013, which is hereby incorporated herein by reference in its entirety.

FIELD

The present invention relates to a spectacle lens for a display device that can be fitted on the head of a user and generates an image, and a display device with such a spectacle lens.

BACKGROUND

Spectacle lenses often comprise, seen in top view onto the spectacle lens, a coupling-in section in an edge area of the spectacle lens and a coupling-out section in a central area of the spectacle lens, wherein light bundles of pixels of the generated image, which are coupled into the spectacle lens via the coupling-in section of the spectacle lens, are guided in the spectacle lens to the coupling-out section and coupled out of the spectacle lens via the coupling-out section in order to provide a virtual image. In practice, it has been shown that it is difficult on the one hand to form the spectacle lens as thin as possible and on the other hand to provide as large as possible an exit pupil for the coupled-out light beams. As a rule, therefore, so-called pupil expanders are formed in the coupling-out section in order to realize the desired expansion of the exit pupil. These are often formed as diffractive pupil expanders which on the one hand display a strong dependency on wavelength and on the other hand are difficult to realize.

SUMMARY

An object of the invention is to provide a spectacle lens with which the difficulties named above can be overcome as completely as possible.

The disclosure includes a spectacle lens for a display device that can be fitted on the head of a user and generates an image, wherein the spectacle lens comprises a spectacle lens body comprising a front side and a rear side, wherein the front side and/or the rear side is/are curved and the spectacle lens body comprises a first and a second partial body, the mutually facing boundary surfaces of which are connected to each other, and, seen in top view onto the spectacle lens, a coupling-in section in an edge area of the spectacle lens and a reflective coupling-out section, which comprises reflective facets, in a central area of the spectacle lens, as well as a splitter layer arranged between the two boundary surfaces in the area of the coupling-out section, wherein the spectacle lens is suitable for guiding light bundles of pixels of the generated image, which are coupled into the spectacle lens via the coupling-in section of the spectacle lens, in the spectacle lens by reflections on the rear side and a reflecting surface lying opposite this to the coupling-out section and coupling them out of the spectacle lens via the coupling-out section, wherein the splitter layer in each case reflects a portion of light bundles reflected by the rear side towards the rear side and transmits a portion, wherein after reflection on the rear side the reflected portion strikes the splitter layer again and there, once again, is partially reflected towards the rear side and partially transmitted, wherein the transmitted portions strike the facets, which bring about a reflection in the direction of the rear side such that a coupling-out takes place through the splitter layer and the rear side.

The desired widening of the pupil can be achieved easily with this spectacle lens because it is ensured by means of the splitter layer that the light bundles (or the respectively transmitted portion of each light bundle) strike the facets of the coupling-out section in each case multiple times laterally spaced apart, with the result that after deflection has taken place (by means of reflection) on the facets the desired coupling-out is present at the same time as the exit pupil is expanded.

The coupling-out section thus acts as a reflective coupling-out section because the reflective facets are provided such that they do not generate an intended or a desired diffractive effect.

In the spectacle lens according to the invention the reflectivity of the splitter layer can increase in the direction from the coupling-in to the coupling-out section.

Furthermore, the facets can be formed as partially reflective facets. In particular, the reflectivity of the facets can increase in the direction from the coupling-in to the coupling-out section.

In addition, it is possible for the facets to be formed as reflective facets (where possible with 100% reflection).

The facets can be arranged directly next to each other in such a way that, in top view onto the facets, a (substantially) continuous reflective or partially reflective layer is present. Alternatively, the neighbouring facets can be spaced apart from each other, with the result that there are transparent gaps between them (seen in top view).

The reflecting surface can be the front side or a reflecting layer applied to the front side. Furthermore, it is possible for the reflecting surface to be formed between the two boundary surfaces of the two partial bodies.

The reflection on the rear side and/or the reflection on the reflecting surface can be brought about by total internal reflection.

The facets can be formed on the front side of the spectacle lens body. In particular, the facets can be formed as buried facets. In this case, the depressions which are formed by the facets are filled in with the material of the spectacle lens body (or of the corresponding partial body), with the result that a smooth front side is formed, and in particular the filling is carried out such that the original curvature profile of the front side is also present in the area of the buried facets.

The reflecting surface can be formed flat or curved. The splitter layer can also be formed flat or curved.

In the case of a curved formation of the reflecting surface and/or splitter layer, this can be used to correct imaging errors in the imaging of the light bundles.

The reflecting surface and the splitter layer can be implemented by the same layer.

The coupling-in section and/or the coupling-out section can have an imaging effect.

In addition, it is possible for the coupling-in section to have a collimation effect. The coupling-in section can furthermore be refractive and/or reflective.

It is possible to carry out the coupling into the spectacle lens via an end face which connects the front and rear sides. In particular, the end face can have an imaging function.

The spectacle lens according to the invention can be formed from plastic or glass.

By a facet is meant, in particular, a piece of surface, a surface element or a surface. The piece of surface, the surface element or the surface can provide the described optical effect of the facet.

The disclosure further includes a display device, including a holder that can be fitted on the head of a user, an image-generating module secured to the holder, which generates an image, and an imaging optical system secured to the holder, wherein the imaging optical system comprises a spectacle lens according to the invention and, when the holder is fitted on the head, images the generated image such that the user can perceive it as a virtual image.

The imaging optical system can comprise the spectacle lens as the only optical element. However, it is also possible for the imaging optical system to comprise, in addition to the spectacle lens, also at least one further optical element.

Thus, the further optical element can be e.g. a collimation optical system which is arranged between the spectacle lens and the image-generating module, with the result that the light bundles from the image-generating module can be coupled into the spectacle lens as collimated bundles.

In particular, the imaging optical system can be designed such that the extent of all light bundles in the coupling-in section is as small as possible. This can be achieved in particular in that the entrance pupil of the imaging optical system is placed in the area of the coupling-in section.

The image-generating module can in particular comprise a two-dimensional imaging system, such as e.g. an LCD module, an LCoS module, an OLED module or a tilting mirror matrix. The imaging system can be self-luminous or not self-luminous.

The image-generating module can in particular be formed such that it generates a monochromatic or a multi-coloured image.

The display device according to the invention can comprise further elements known to a person skilled in the art which are necessary for its operation.

It is understood that the features named above and those yet to be explained below can be used not only in the stated combinations but also in other combinations or alone, without departing from the scope of the present invention.

It is understood that the features mentioned above and those yet to be explained below can be used not only in the stated combinations but also in other combinations or alone, without departing from the scope of the present invention.

Figure 1:
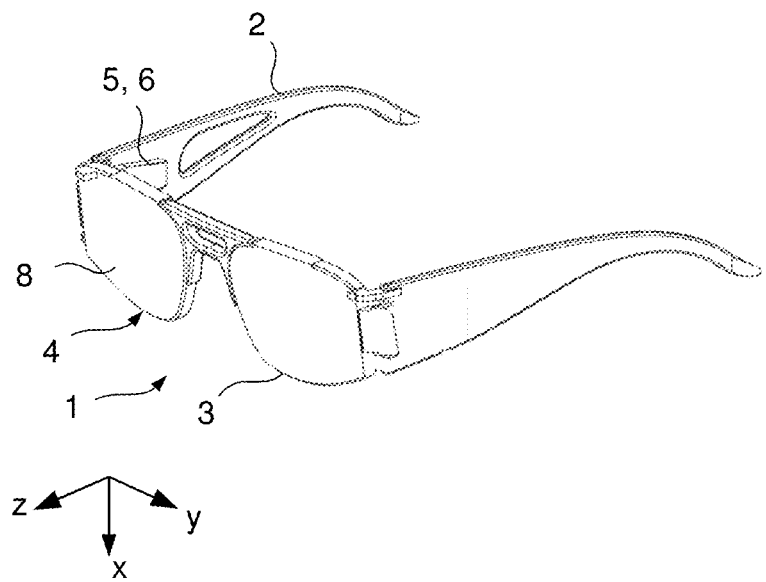
FIG. 1 is a schematic perspective representation of an embodiment of the display device according to the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the embodiment shown in FIG. 1 the display device 1 according to the invention comprises a holder 2 that can be fitted on the head of a user and can be formed e.g. in the manner of a conventional spectacles frame, as well as a first and a second spectacle lens 3, 4, which are secured to the holder 2. The holder 2 with the spectacle lenses 3 and 4 can be formed e.g. as sports glasses, sunglasses and/or glasses for correcting defective vision, wherein a virtual image can be reflected into the user's field of view via the first spectacle lens 3, as described below.

The spectacle lenses 3 and 4, and in particular the left-hand spectacle lens 3, are only described together with the display device 1 according to the invention by way of example. The spectacle lenses 3, 4, or at least the left-hand spectacle lens, are in each case formed separately as a spectacle lens 3, 4 according to the invention. The left-hand spectacle lens 3 according to the invention can, naturally, also be formed as the right-hand spectacle lens.

Figure 2:
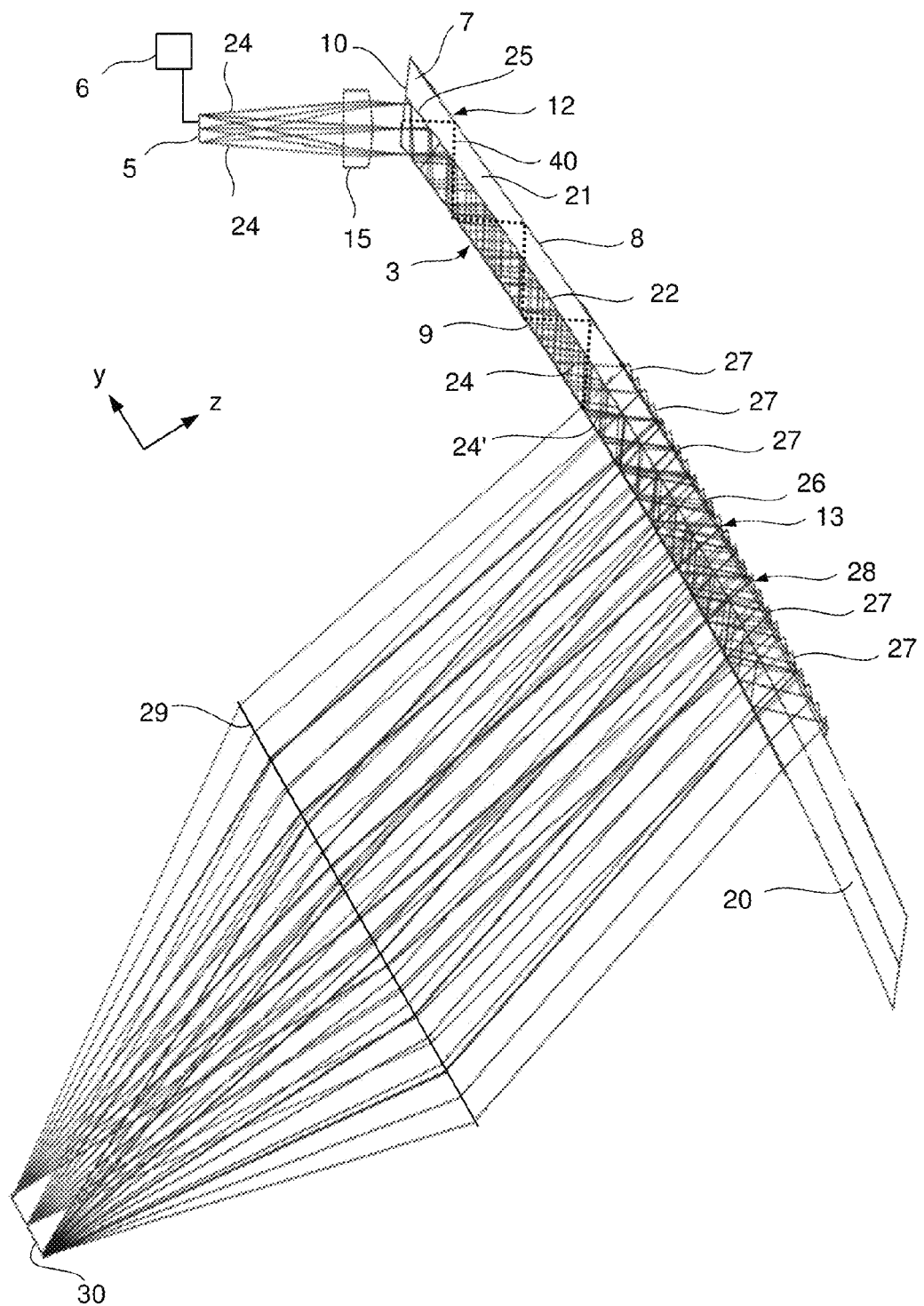
FIG. 2 is a detailed sectional view of the first spectacle lens from FIG. 1.
Figure 4:
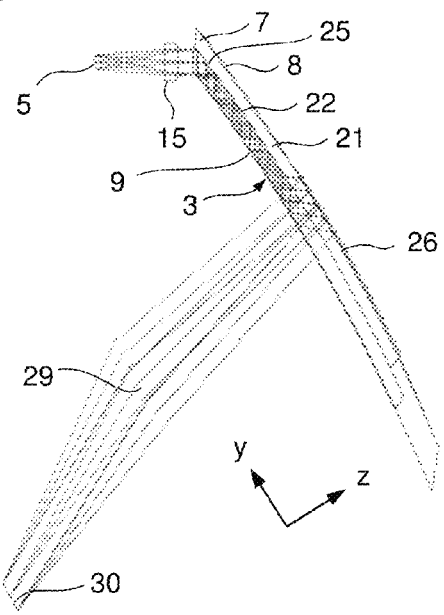
FIGS. 4-8 are sectional views of the first spectacle lens to explain the different couplings-out by means of the coupling-out section.
Figure 5:
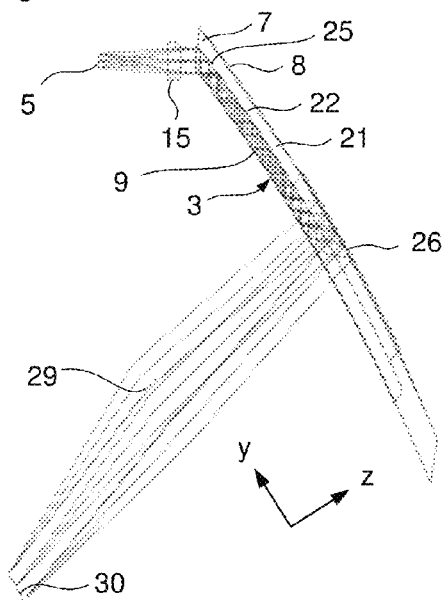
Figure 6:
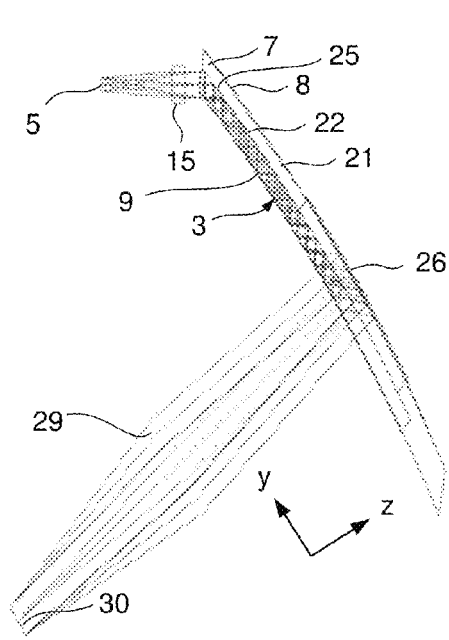
Figure 7:
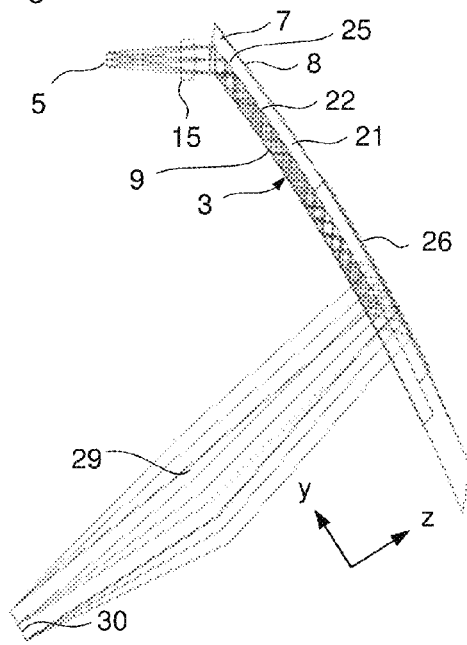
Figure 8:
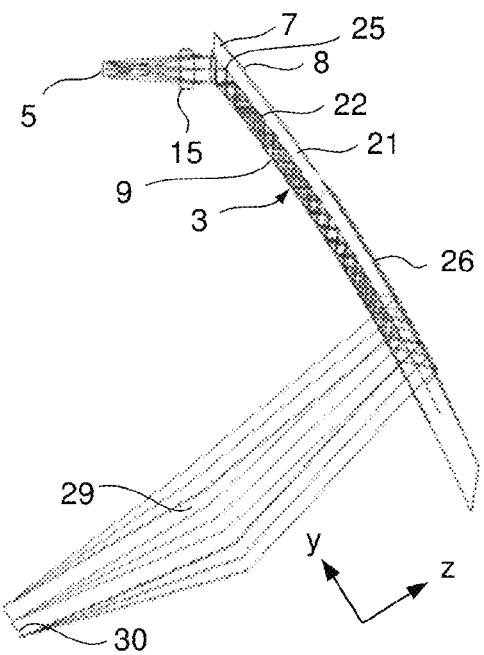

As can best be seen from the detailed sectional view of the first (left-hand) spectacle lens 3 in FIG. 2 (the holder 2 is not represented), the display device 1 comprises an image-generating module 5, a control unit 6 and a coupling-in optical system 15. The image-generating module 5, the control unit 6 and the coupling-in optical system 15 are represented purely schematically and are preferably secured to the holder 2. The image-generating module 5 can comprise e.g. a two-dimensional light modulator (such as e.g. an OLED, CMOS or LCoS chip or a tilting mirror matrix) with a plurality of pixels e.g. arranged in rows and columns. A light bundle 24 can emerge from each pixel.

The left-hand spectacle lens 3 comprises a spectacle lens body 7 with a curved front side 8, a curved rear side 9 and an end face 10. The spectacle lens body 7 is formed in two parts and comprises an inner partial body 20 and an outer partial body 21. The mutually facing sides of the two partial bodies 20, 21 have corresponding curvatures, with the result that they can be connected flat to each other. A reflecting layer 22 (e.g. titanium dioxide) which extends from the edge area 12 to the central area 13 of the spectacle lens 3 is arranged between the two mutually facing sides. A coupling-in section 25 is formed on the edge area 12 and a coupling-out section 26 is formed in the central area 13.

As can be seen from the representation in FIG. 2, the light bundles 24 run from the image-generating module 5 to the coupling-in optical system 15, and enter the spectacle lens (here the inner partial body 20) via the end face 10 and the rear side 9 such that they are reflected by the reflecting layer 22 to the rear side 9 at an angle at which a total internal reflection takes place on the rear side 9. The light bundles are thus reflected back and forth between the reflecting layer 22 and the rear side 9 and guided thereby to the coupling-out section 26.

In the area of the coupling-out section 26 the reflecting layer 22 is formed as a splitter layer 22 which reflects a portion of each light bundle 24 striking it and transmits a portion. The transmitted portion runs through the outer partial body 21 and strikes facets 27 of a Fresnel structure 28 which is formed on the front side 9 in the area of the coupling-out section 26. The facets 27 are formed partially reflective and bring about (by reflection) a beam path folding in the direction of the splitter layer 22 and the rear side 9 such that the thus-reflected portion of the light bundles 24 passes through the splitter layer 22 and the rear side 9 (because a total internal reflection on the rear side 9 no longer takes place due to the small angle of incidence) and is thereby coupled out.

Figure 3:
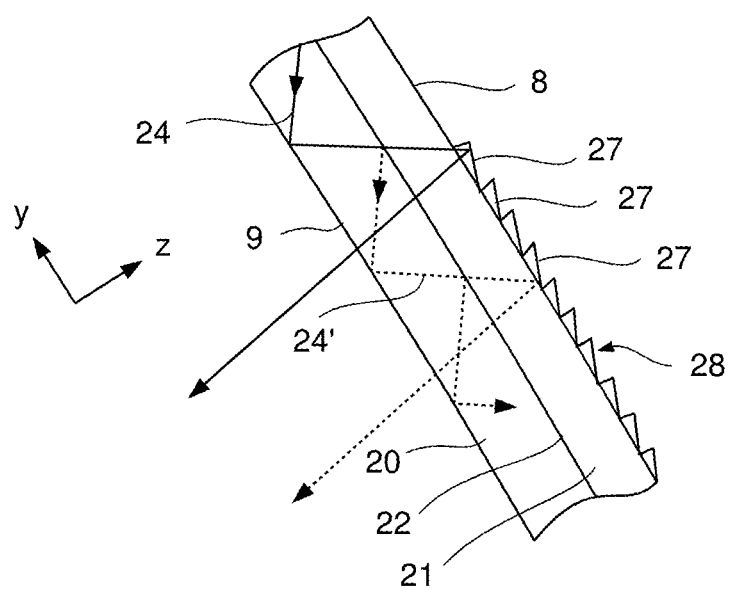
FIG. 3 is a detailed magnification of a part of the coupling-out section according to FIG. 2.

The portion reflected by the splitter layer 22 is totally reflected on the rear side 9 and thus, as light bundle 24', again strikes the splitter layer 22 laterally offset (thus offset in the direction from the coupling-in to the coupling-out section 25, 26), where once again a portion is transmitted and a portion is reflected. The transmitted portion of the light bundle 24' strikes further facets 27 laterally offset and is, once again, deflected by these such that a coupling-out takes place. The portion of the light bundle 24' reflected by the splitter layer 22 again strikes the rear side 9 laterally offset and is totally reflected by it. This mode of operation of the splitter layer 22 is represented schematically again in the magnified detailed view in FIG. 3, wherein the light bundle 24' is shown as a dashed line.

In this way, a pupil expander is realized by means of the Fresnel structure 28, the splitter layer 22 and the rear side 9 in the area of the coupling-out section 26, with the result that a large expansion of the exit pupil 29 in the lateral direction can be realized.

This enlargement of the exit pupil 29 is carried out in the spectacle lens 3 according to the invention because, due to the very thin formation of the spectacle lens body 7, a bundle diameter of a single coupling-out is not sufficient to fill the exit pupil 29. The exit pupil 29 can also be called an eyebox. This is the area which is provided by the display device 1 and in which the user's eye can move and he can still always perceive the coupled-out image. For each field point (or pixel of the image to be presented), therefore, for example two or three neighbouring couplings-out are necessary in order to fill the pupil of the user's eye positioned in one place in the eyebox 29. These e.g. two or three couplings-out should therefore be imaged onto the same image point (lying within the resolution of the eye) on the retina. Congruence is thus to be present. By this is meant in particular that, within the framework of a resolution of the eye of less than 1 min, the same location on the retina is struck. It can also be said that the same main beam angle is present for these neighbouring couplings-out for one field point.

The reflecting layer 22 can be formed, in the area between the coupling-in and the coupling-out section 25, 26 in the same way as in the area of the coupling-out section 26, as a splitter layer which reflects a portion of the light bundle striking it and transmits a portion. Only the reflected portion is represented in FIG. 2. Alternatively, the reflecting layer can be formed between the coupling-in and the coupling-out section 25, 26 such that it acts as a total internal reflection layer in such a way that from a predetermined angle of incidence it reflects the light bundles 24 and transmits light with an angle of incidence smaller than the predetermined angle of incidence. In this case a user of the display device can also look through the area of the reflecting layer between the coupling-in and the coupling-out section 25, 26. Furthermore, the reflecting layer between the coupling-in and the coupling-out section 25, 26 can have any other desired reflectivity (greater than 0% to 100%).

The reflecting layer 22 can also extend in the area of the coupling-in section 25. Here, it is preferably formed as a reflecting layer which completely reflects the light bundles incident on it (thus where possible a 100% reflection). This is possible without a negative impact for the user as he does not look through the spectacle lens in this edge area. In particular, this edge area can e.g. be located in the area of the side temple stem or corresponding hinge of the holder 2.

In the described embodiment the coupling-in of the light bundles takes place partially via the rear side 9 and partially via the end face 10 (here the section of the end face 10 of the inner partial body 20). Naturally, the coupling-in can also take place such that it is carried out either only via the end face 10 or only via the rear side 9.

In FIG. 2, the position 30 of the retina of an eye of a user wearing the display device 1 is also drawn in, to illustrate that the several couplings-out for each field point in the retina are congruent.

The Fresnel structure 28 can be formed such that, in addition to the beam deflection, it also realizes an imaging function. This can be achieved in that a curved reflective surface which has the desired imaging properties is used as a starting point, and this is then adjusted by the facets 27. The individual facets 27 can be flat or curved. Such a procedure is described for example in WO 2010/097442 A1 and in WO 2010/097439 A1, wherein the corresponding descriptions and figures of these published documents are hereby incorporated in the present disclosure.

The spectacle lens body 7 according to FIG. 2 can have a thickness of for example 2.0 mm. The magnitude of the radii of curvature of the front and the rear side 8, 9 is 90 mm. The generated field of view is 10°×4°. PMMA can e.g. be used as material for the spectacle lens body 7. The diameter, and thus the maximum lateral extent, of the eyebox is 7 mm and at most five couplings-out take place in order to fill the pupil of the eye, wherein the pupil of the eye is assumed to have a diameter of 2 to 3 mm.

The splitter layer 22 is in particular formed such that in the area of the coupling-out section 26 it has an increasing transmissivity (and thus a diminishable reflectivity) in the direction from the coupling-in to the coupling-out section 26.

Furthermore, the shape of the mutually facing sides of the inner and outer partial bodies 20, 21, and thus the shape of the reflecting layer 22, for the imaging of the image generated by means of the image-generating module 5 as a virtual image can be taken into account in the optimization of the imaging properties which are provided by the spectacle lens 3 according to the invention. Thus, the reflecting layer 22 can e.g. be designed as a free-form surface (which has different curvatures e.g. in two orthogonal sections or two principal sections), whereby a clear improvement of the imaging quality in the reflection is possible without affecting the transmitted-light imaging quality (which is only determined by the front and the rear side 8, 9).

Thus, e.g., the curvature of the rear side 9, which is often used to correct defective vision, can be compensated for by corresponding formation of the curvature of the reflecting layer 22, without the transmitted-light imaging properties being affected. The curvature of the front side 8 can e.g. also be taken into account, where necessary, with the result that the virtual image also has the desired defective vision correction for the user after passing through the rear side 9.

In the representations in FIGS. 4 to 8 the five different couplings-out for the two edge field points and the field centre are represented. All further couplings-out no longer reach the eye and are therefore also no longer represented.

Figure 9:
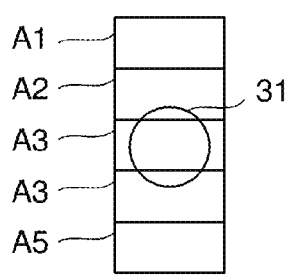
FIGS. 9-11 are views of the exit pupil with the pupil of the eye in the same position for different field points.
Figure 9:
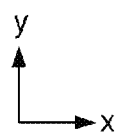

In FIG. 9 the illumination of the pupil 31 of the user's eye is shown when it is positioned in the centre of the eyebox 29, wherein the five couplings-out are labelled A1, A2, A3, A4 and A5. As can be seen from the imaging in FIG. 9, the third coupling-out (A3) contributes the most to the imaging, wherein small portions of the second and fourth couplings-out (A2, A4) further supplement it.

Figure 10:
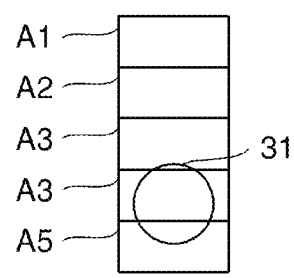
Figure 10:
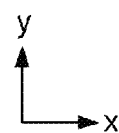
Figure 11:
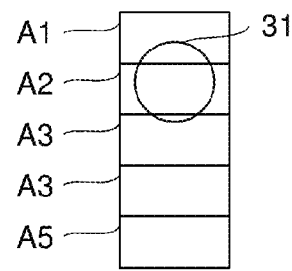
Figure 11:
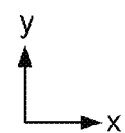

In FIG. 10, in a similar way to FIG. 9, it is represented which couplings-out for the light bundle of the lower field edge (−5°) contribute to the image formation. These are essentially the fourth and fifth couplings-out A4, A5. In FIG. 11 the same representation is shown for the upper field edge (+5°). This shows that the first and second couplings-out A1, A2 are perceived.

Figure 12:
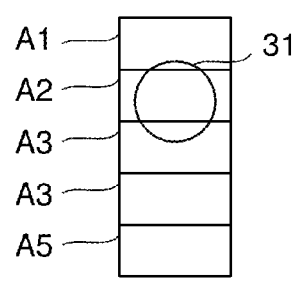
FIGS. 12-14 corresponding views to FIGS. 9-11 with the location of the pupil of the eye shifted horizontally.
Figure 12:
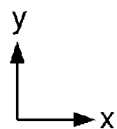
Figure 13:
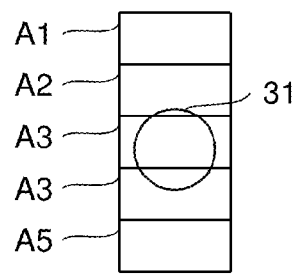
Figure 13:
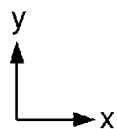
Figure 14:
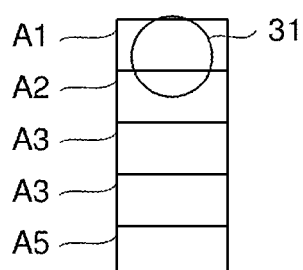
Figure 14:
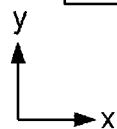

In FIGS. 12 to 14 corresponding representations are shown with the location of the pupil of the eye 31 shifted horizontally (in the y-direction) inside the eyebox 29.

In a modification of the previously described embodiments, the reflecting layer 22 is formed transparent, or not provided, from the coupling-in section 25 to shortly before the coupling-out section 26, with the result that in this area the light guiding takes place by total internal reflection on the front and rear sides 8, 9 (indicated in FIG. 2 by the dashed line 40).

Only in the area of the coupling-out section 26 does the reflecting layer 22 then act as a splitter layer in the already described manner, with the result that a portion of each light bundle 24 striking it is transmitted and a portion is reflected (the beam path is then identical to the previously described embodiment, with the result that the line 40 is no longer drawn in the area of the coupling-out section). The transmitted portion strikes the Fresnel structure 28, is deflected by it and thus coupled out towards the exit pupil 29. The reflected portion is reflected on the rear side again towards the splitter layer 22, with the result that the desired widening of the exit pupil 29 takes place. The splitter layer 22 is in turn designed such that it has an increasing transmittance, and thus a decreasing reflectivity, in the direction from the coupling-in to the coupling-out section 25, 26.

Figure 15:
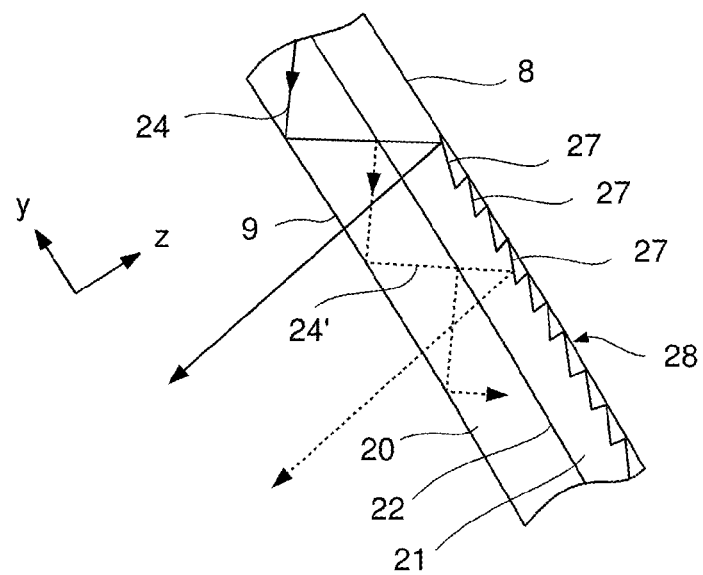
FIG. 15 is a representation according to FIG. 3 to explain a modification of the formation of the facets of the coupling-out section.

In the previously described embodiments the facets 27 are formed on the front side 8. However, it is also possible for the facets 27 to be formed in the spectacle lens body 7 and in particular in the outer partial body 21, as indicated in the schematic representation in FIG. 15. FIG. 15 substantially corresponds to the representation from FIG. 3, wherein, however, the facets 27 are now formed as buried facets 27 in the spectacle lens body 7. The depressions formed by the facets 27 are preferably filled in, with the result that the original curvature profile of the front side 8 is present in the coupling-out area 26. No undesired refractions thereby occur in the area of the coupling-out section 26 when the surroundings are observed through the spectacle lens 3.

In the previous embodiments the facets 27 are formed as partially reflective facets. However, they can also be formed as reflective facets (where possible with a reflection of 100%). In this case, a transmitted-light observation is not possible for the observer in the area of the coupling-out section. However, it is furthermore possible to arrange the partially reflective or reflective facets 27 not only in the described manner, such that, seen in top view, a continuous partially reflective or reflective surface is formed, but spaced apart from each other, with the result that a transmissive area without facets 27 is present between two facets 27 in each case. In this case, even if the facets 27 are formed as reflective facets 27, a transmitted-light observation through the coupling-out section 26 is possible as well.

In the described embodiments of the display device 1 according to the invention the reflection of the virtual image into the user's field of view takes place via the left-hand spectacle lens 3. Naturally, a reflection via the right-hand spectacle lens 4 is also possible. In addition, the display device 1 can be formed such that items of information (or virtual images) are reflected in via both spectacle lenses 3, 4. The reflection can take place such that there is a three-dimensional image impression. The spectacle lenses 3, 4 can have a refractive power of zero or a refractive power different from zero (in particular to correct defective vision). The spectacle lenses 3, 4 can be produced e.g. from a glass or also from plastic and can, naturally, be used in other display devices that can be fitted on the head of the user.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A spectacle lens for a display device that can be fitted on the head of a user and generate an image, the spectacle lens comprising:
   a spectacle lens body comprising a front side and a rear side, wherein at least one of the front side and the rear side are curved, and the spectacle lens body further comprising a first partial body and a second partial body, each including mutually facing boundary surfaces which are connected to each other, with, as seen in top view onto the spectacle lens, a coupling-in section in an edge area of the spectacle lens and a reflective coupling-out section, which comprises reflective facets, in a central area of the spectacle lens; and
   a splitter layer arranged between the two boundary surfaces in the area of the coupling-out section,
   wherein the spectacle lens is configured to guide light bundles of pixels of the generated image, which are coupled into the spectacle lens via the coupling-in section of the spectacle lens, in the spectacle lens by reflections on the rear side and a reflecting surface lying opposite this to the coupling-out section and coupling them out of the spectacle lens via the coupling-out section, and
   wherein the splitter layer reflects a portion of light bundles reflected by the rear side towards the rear side and transmits a portion, wherein after reflection on the rear side the reflected portion strikes the splitter layer again and there, once again, is partially reflected towards the rear side and partially transmitted, wherein the transmitted portions strike the facets, which bring about a reflection in the direction of the rear side such that the portions reflected by the facets are coupled out of the spectacle lens through the splitter layer and the rear side, wherein a reflectivity property of the splitter layer decreases in the direction from the coupling-in to the coupling-out section.

2. The spectacle lens according to claim 1, wherein the facets are formed as partially reflective facets.

3. The spectacle lens according to claim 2, wherein a reflectivity property of the facets increases in the direction from the coupling-in to the coupling-out section.

4. The spectacle lens according to claim 1, wherein the reflecting surface is the front side.

5. The spectacle lens according to 1, wherein the reflecting surface is formed between the two boundary surfaces of the first and the second partial bodies.

6. The spectacle lens according to claim 1, wherein a depression defined by the facets is filled in with material of the partial body, in which the facets are formed, such that a smooth front side is formed.

7. The spectacle lens according to claim 1, wherein the reflecting surface is formed flat.

8. The spectacle lens according to claim 1, wherein the splitter layer is formed flat.

9. The spectacle lens according to claim 1, wherein the splitter layer is formed curved.

10. The spectacle lens according to claim 1, wherein at least one of the coupling-in section and the coupling-out section have an imaging effect.

11. The spectacle lens according to claim 1, wherein the coupling-in section has a collimation effect.

12. The spectacle lens according to claim 1, wherein the coupling-in section is at least one of refractive and reflective.

13. The spectacle lens according to claim 1, wherein the reflecting surface and the splitter layer are each implemented by a common layer.

14. A display device, comprising:
   a holder configured to be fitted on the head of a user;
   an image-generating module secured to the holder, which generates an image; and
   an imaging optical system secured to the holder, which comprises a spectacle lens according to claim 1 and which, when the holder is fitted on the head, images the generated image such that the user can perceive it as a virtual image.

15. A spectacle lens for a display device that can be fitted on the head of a user and generate an image, the spectacle lens comprising:

a spectacle lens body comprising a front side and a rear side, wherein at least one of the front side and the rear side are curved, and the spectacle lens body further comprising a first partial body and a second partial body, each including mutually facing boundary surfaces which are connected to each other, with, as seen in top view onto the spectacle lens, a coupling-in section in an edge area of the spectacle lens and a reflective coupling-out section, which comprises reflective facets, in a central area of the spectacle lens; and
   a splitter layer arranged between the two boundary surfaces in the area of the coupling-out section,
   wherein the spectacle lens is configured to guide light bundles of pixels of the generated image, which are coupled into the spectacle lens via the coupling-in section of the spectacle lens, in the spectacle lens by reflections on the rear side and a reflecting surface lying opposite this to the coupling-out section and coupling them out of the spectacle lens via the coupling-out section, and
   wherein the splitter layer reflects a portion of light bundles reflected by the rear side towards the rear side and transmits a portion, wherein after reflection on the rear side the reflected portion strikes the splitter layer again and there, once again, is partially reflected towards the rear side and partially transmitted, wherein the transmitted portions strike the facets, which bring about a reflection in the direction of the rear side such that the portions reflected by the facets are coupled out of the spectacle lens through the splitter layer and the rear side,
   wherein the reflecting surface is the front side.

16. The spectacle lens according to claim 15, wherein the facets are formed as partially reflective facets.

17. The spectacle lens according to claim 16, wherein a reflectivity property of the facets increases in the direction from the coupling-in to the coupling-out section.

18. The spectacle lens according to claim 15, wherein a depression defined by the facets is filled in with material of the partial body, in which the facets are formed, such that a smooth front side is formed.

19. The spectacle lens according to claim 15, wherein a reflectivity property of the splitter layer decreases in the direction from the coupling-in to the coupling-out section.

20. The spectacle lens according to claim 5, wherein at least one of the coupling-in section and the coupling-out section have an imaging effect.

* * * * *